(12) United States Patent
Kawaji et al.

(10) Patent No.: US 10,281,160 B2
(45) Date of Patent: May 7, 2019

(54) METHODS FOR MEETING LOCALIZED PEAK LOADS IN BUILDINGS AND URBAN CENTERS

(71) Applicants: Masahiro Kawaji, New York, NY (US); Hitesh Bindra, New York, NY (US)

(72) Inventors: Masahiro Kawaji, New York, NY (US); Hitesh Bindra, New York, NY (US)

(73) Assignee: The Research Foundation of the City University of New York, New York, NY (US)

( * ) Notice: Subject to any disclaimer, the term of this patent is extended or adjusted under 35 U.S.C. 154(b) by 0 days.

(21) Appl. No.: 15/029,953

(22) PCT Filed: Oct. 21, 2014

(86) PCT No.: PCT/US2014/061490
§ 371 (c)(1),
(2) Date: Apr. 15, 2016

(87) PCT Pub. No.: WO2015/061261
PCT Pub. Date: Apr. 30, 2015

(65) Prior Publication Data
US 2016/0231004 A1 Aug. 11, 2016

Related U.S. Application Data

(60) Provisional application No. 61/895,122, filed on Oct. 24, 2013.

(51) Int. Cl.
*F28D 20/00* (2006.01)
*F24D 11/00* (2006.01)
(Continued)

(52) U.S. Cl.
CPC .......... *F24D 11/008* (2013.01); *F24D 11/006* (2013.01); *F28D 17/005* (2013.01);
(Continued)

(58) Field of Classification Search
CPC ......... F28D 20/0056; F28D 2020/0065; F28D 17/00; F28D 17/005; F28D 20/00; F24D 11/008; F24D 11/006
See application file for complete search history.

(56) References Cited

U.S. PATENT DOCUMENTS 4,061,267 A    12/1977  Lof
4,259,401 A *  3/1981   Chahroudi .............. E04C 1/392
                                                        126/618
(Continued)

FOREIGN PATENT DOCUMENTS

CN          2786533 Y      6/2006
WO       2013/015834 A1    1/2013

OTHER PUBLICATIONS

International Search Report dated Dec. 31, 2014 for PCT/US14/61490.
(Continued)

*Primary Examiner* — Devon Russell
(74) *Attorney, Agent, or Firm* — Burns & Levinson LLP; Orlando Lopez (57) ABSTRACT

A method to use high temperature thermal storage for integration into building heating/cooling systems and to meet building's peak power demand. The method can be used to store the thermal energy at any desirable rate and then discharge this stored energy to meet the demand for short or long time intervals. Input energy stored with this method is thermal energy, however, output can be thermal or electric based upon the requirement.

14 Claims, 12 Drawing Sheets

(51) Int. Cl.
*F28D 17/00* (2006.01)
*F25B 17/08* (2006.01)
*F24F 5/00* (2006.01)

(52) U.S. Cl.
CPC ......... *F28D 20/00* (2013.01); *F28D 20/0056* (2013.01); *F24D 2220/10* (2013.01); *F24F 5/0017* (2013.01); *F25B 17/08* (2013.01); *F28D 2020/0017* (2013.01); *F28D 2020/0065* (2013.01); *F28D 2020/0078* (2013.01); *Y02A 30/277* (2018.01); *Y02A 30/62* (2018.01); *Y02B 30/62* (2013.01); *Y02E 60/142* (2013.01)

(56) References Cited

U.S. PATENT DOCUMENTS

| | | | |
|---|---|---|---|
| 4,286,141 A | | 8/1981 | MacCracken |
| 4,405,010 A | * | 9/1983 | Schwartz ............ F28D 20/0056 165/10 |
| 5,542,022 A | | 7/1996 | Zauderer |
| 5,615,738 A | * | 4/1997 | Cameron ................. F28F 9/22 165/103 |
| 7,647,773 B1 | * | 1/2010 | Koenig ..................... F03G 7/04 60/641.2 |
| 7,954,321 B2 | | 6/2011 | Shinnar |
| 2008/0066736 A1 | * | 3/2008 | Zhu ........................ F03G 6/005 126/620 |
| 2009/0178409 A1 | * | 7/2009 | Shinnar ..................... F01K 3/00 60/645 |
| 2010/0287933 A1 | * | 11/2010 | Niknafs ..................... F24J 2/34 60/641.8 |
| 2010/0301614 A1 | * | 12/2010 | Ruer ......................... F01K 3/12 290/1 A |
| 2012/0167559 A1 | | 7/2012 | Havel |
| 2012/0312496 A1 | | 12/2012 | Howes et al. |
| 2013/0240171 A1 | | 9/2013 | Morgan et al. |
| 2014/0014290 A1 | * | 1/2014 | Howes ................ F28D 20/0056 165/10 |
| 2014/0202157 A1 | | 7/2014 | Shinnar et al. |
| 2015/0114591 A1 | * | 4/2015 | Howes ................ F28D 20/0056 165/10 |

OTHER PUBLICATIONS

Supplementary European Search Report and Search Opinion for European Patent Application No. 14856226.7, dated Jul. 28, 2017.

* cited by examiner

METHODS FOR MEETING LOCALIZED PEAK LOADS IN BUILDINGS AND URBAN CENTERS

CROSS-REFERENCE TO RELATED APPLICATIONS

This application is a U.S. national stage application under 35 U.S.C. 371 of co-pending International Application No. PCT/US2014/061490 filed on Oct. 21, 2014 and entitled, METHODS FOR MEETING LOCALIZED PEAK LOADS IN BUILDINGS AND URBAN CENTERS, which in turn claims priority to and benefit of U.S. Provisional Patent Application No. 61/895,122, the contents of which are incorporated by reference herein in its entirety for all purposes.

BACKGROUND

Packed beds have been utilized for various heat and mass transfer operations, e.g. adsorption, thermal storage, chromatography etc. The performance of packed beds in most of these systems is analyzed using concentration or temperature profile in the bed and their progression in time. It is desirable, in many systems, to have a profile which progresses in the form of sharp front. For such a profile, the space or material utilization is maximum and recovery is very efficient. However, many difficulties are encountered in real life to achieve such sharp front. In thermal or heat storage processes, having a profile with a sharp front becomes even more important due to exergetic efficiency. Other patents have described certain ways to achieve this sharpness for thermal wave front. However, many systems, it is not feasible to obtain a sharp front. The relative steepness of the front can be increased by increasing the length of the bed traversed or connecting many such beds in series. But this method will largely increase the pressure drop incurred which will increase the operating costs, particularly for the case of gases as the carrier medium.

In any mass transfer or heat transfer operation involving surface or bulk absorption over packed beds, there is always an optimization between pressure drops incurred and transfer effectiveness. This optimization becomes significantly important if the fluids involved are gases as it is more expensive to compress gases. The adsorption, ion-exchange or absorption phenomena in packed bed are dependent upon on several factors such as fluid flow rates, mass transfer coefficient, packing shape and size, porosity etc. The effectiveness of the transport process over the bed is evaluated by the concentration profile of the solute. These concentration profiles, also known as breakthrough curves, determine the effectiveness by the steepness of concentration gradient spread over the bed. Higher steepness makes the system more effective and thus economically feasible. The additional savings for this system is reduction in compression costs considerably.

Figure 1:
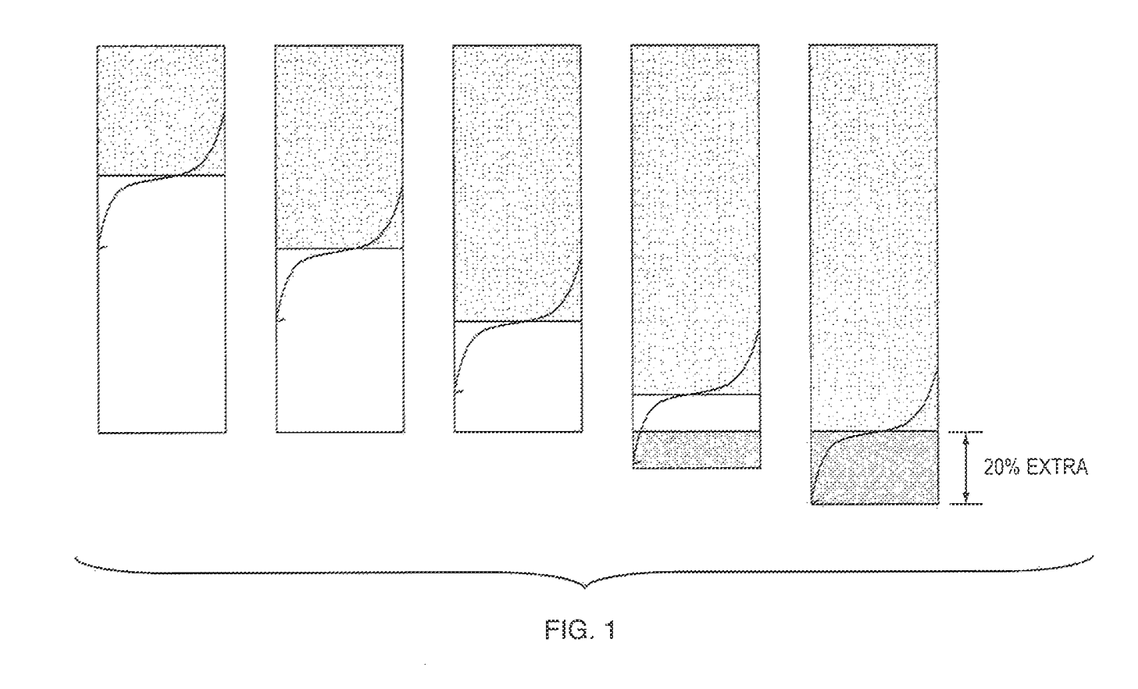
FIG. 1 is a graphical schematic representation of a moving adsorption front in a conventional packed bed.

FIG. 1 depicts a moving adsorption front with constant thickness. Additional length of the bed represents higher fractional utilization. FIG. 1 exemplifies the progression of solute concentration front and illustrates that in order to completely saturate the original bed length it is necessary to introduce additional length (20% extra). The extra bed length implies additional pressure drop. Therefore, if fractional utilization is increased, compression costs increase as well. In case of very sharp fronts without any dispersion effects, such problems do not exist. However for not so sharp fronts and high pressure drop systems this design of a regular packed bed arrangement is not optimal. In fact for some applications such as flue gas treatment, higher pressure drops are not allowed so the overall fractional utilization is increased and systems become expensive.

In large urban areas, which have non-uniform weather patterns, often the grid electricity load demand is highly skewed. In most of the cases, this load variation in electric grid is as a result of variation in heating and cooling requirements of the buildings with seasonal or daily variations in ambient temperature. Due to this reason utilities have to over-design electric power production and/or steam production systems in order to fulfill peak requirements. This requirement to meet the peak energy demand is especially significant in urban areas with a high concentration of large energy users such as 50-100 story office buildings. For example, in Manhattan, N.Y., a utility such as Consolidated Edison provides high pressure steam to large office buildings for heating, but extra steam boilers have to be maintained to meet the peak demand and operated only in the morning hours in winter. This type of additional infrastructure increases the cost of energy supplied and the extra cost is passed onto the consumers. These extra boilers would not be needed if the utility could store energy in batteries or thermal energy storage systems that could meet the peak demand requirements.

There is a need for methods that enable meeting localized peak loads in buildings and urban centers.

BRIEF SUMMARY

Embodiments of methods for meeting localized peak loads in buildings and urban centers are disclosed hereinbelow.

In one embodiment, the method of these teachings for managing the thermal storage capability of a building includes blowing air, after it has been determined that the building is entering a time of peak energy load, the air being blown at a first temperature through a thermal storage bed comprising a number of packed beds, the thermal storage bed having thermal energy stored therein, permitting air at the first temperature to absorb heat from the thermal storage bed, thereby heating the air to a second temperature, and circulating the air at the second temperature to the building, wherein the thermal energy has been stored in the thermal storage bed by: (a) initially injecting fluid, the fluid being the used in a heat/mass transfer operation, into a first packed bed from N (a first number) packed beds (the first packed bed is an instance of an input packed bed), a sensor being disposed between each consecutive one of the packed beds, exit of the fluid is enabled M (a second number) packed beds away from the input packed bed and along a flow path including the input packed bed, a packed bed M of packed beds away from the input packed bed being an output packed bed, (b) sensing, utilizing the sensor between the input packed bed and a consecutive packed bed, a quantity representative of the heat/mass transfer operation, (c) transferring, if output of the sensor disposed between the input packed bed and a next packed bed exceeds a predetermined sensor output, injection of fluid from the input packed bed to a next packed bed in the flow path, referred to as a successor packed bed, and the exit of fluid from the output packed bed to a packed bed succeeding the output packed bed and next to the output packed bed, referred to as a follower packed bed; wherein the follower packed bed was not previously in the flow path, the successor packed bed becoming the input packed bed and the follower packed bed becoming the output packed bed, and (d) repeating steps (b) and (c) until the output packed bed is a last packed bed from the N packed beds.

The these teachings can be used to store thermal energy at any desirable rate and then discharge this stored energy to meet the demand for short or long time intervals. Input energy stored with this method is thermal energy, however, output can be thermal or electric based upon the requirement.

For a better understanding of the present teachings, together with other and further objects thereof, reference is made to the accompanying drawings and detailed description and its scope will be pointed out in the appended claims.

DETAILED DESCRIPTION

The following detailed description is of the best currently contemplated modes of carrying out these teachings. The description is not to be taken in a limiting sense, but is made merely for the purpose of illustrating the general principles of these teachings, since the scope of these teachings is best defined by the appended claims. Although the teachings have been described with respect to various embodiments, it should be realized these teachings are also capable of a wide variety of further and other embodiments within the spirit and scope of the appended claims.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range. However, any ranges not cited in the claims are only intended for illustration and not for limiting the range covered by our invention. Numerical values are cited for exemplary reasons and to identify embodiments and are not intended to limit the general concept of these teachings.

As used herein, "Biot number" refers to a ratio of the product of the heat transfer coefficient and a characteristic length, typically defined as the volume of the body divided by the surface area of the body, to the thermal conductivity of the body.

As used herein, a "signal actuation component" is a component that participates in sending a signal to a flow connection/control component, where the signal causes actuation or a change in behavior of the flow connection/control component.

Embodiments of methods for meeting localized peak loads in buildings and urban centers are disclosed hereinbelow.

In one embodiment, the method for optimizing utilization of packed beds in a heat/mass transfer operation includes (a) initially injecting fluid, the fluid being the used in a heat/mass transfer operation, into a first packed bed from N (a first number) packed beds (the first packed bed is an instance of an input packed bed), a sensor being disposed between each consecutive one of the packed beds, exit of the fluid is enabled M (a second number) packed beds away from the input packed bed and along a flow path including the input packed bed, a packed bed M of packed beds away from the input packed bed being an output packed bed, (b) sensing, utilizing the sensor between the input packed bed and a consecutive packed bed, a quantity representative of the heat/mass transfer operation, (c) transferring, if output of the sensor disposed between the input packed bed and a next packed bed exceeds a predetermined sensor output, injection of fluid from the input packed bed to a next packed bed in the flow path, referred to as a successor packed bed, and the exit of fluid from the output packed bed to a packed bed succeeding the output packed bed and next to the output packed bed, referred to as a follower packed bed, wherein the follower packed bed was not previously in the flow path, the successor packed bed becoming the input packed bed and the follower packed bed becoming the output packed bed, and (d) repeating steps (b) and (c) until the output packed bed is a last packed bed from the N packed beds. In the above disclosed embodiment, M and N are different from each other and, for each instantiation, M and N are determined integers.

In one embodiment, the system for optimizing utilization of packed beds in a heat/mass transfer operation includes a first number of packed beds, a number of flow connection/control components, one flow connection/control component disposed between two consecutive packed beds such that, when flow occurs, each packed bed in the flow path is connected in series to a successive packed bed in the flow path, a number of sensors, each sensor connected in series between one packed bed and a successive packed bed, and a control subsystem transferring, if output of the sensor disposed between an input packed bed and a next packed bed exceeds a predetermined sensor output, injection of fluid from the input packed bed to a next packed bed in the flow path (referred to as a successor packed bed), and the exit of fluid from an output packed bed to a packed bed succeeding the output packed bed and next to the output packed bed (referred to as a follower packed bed), wherein the follower packed bed was not previously in the flow path, the successor packed bed becoming the input packed bed and the follower packed bed becoming the output packed bed. The control subsystem is operatively connected to the sensors and to the flow connection/control components. The flow connection/control components enable initially injecting fluid, the fluid being the used in a heat/mass transfer operation, into a first packed bed, the first packed bed being initially the input packed bed, and exit of the fluid from a packed bed M packed beds away from and along the flow path including the input packed bed. The packed bed M packed beds away from the input packed bed is the output packed bed.

Hereinbelow, embodiments where M=1 are disclosed in order to better illustrate the present teachings. In that embodiment, the number of packed beds in the flow path is 2. It should be noted that these teachings are not only limited to that embodiment.

In one group of embodiments, the N packed beds constitute a thermal storage system and the sensor senses temperature. Thermal storage systems are utilized in a variety of energy related applications, such as combined cycle power plants and power generation by a variety of energy sources such as, solar, steam and nuclear energy. Examples of such thermal storage systems are given in such as the thermal storage systems disclosed in U.S. Pat. No. 7,954,321, issued on Jun. 7, 2011 to R. Shinnar, and in US Patent Application Publication 20090178409, "Apparatus And Method For Storing Heat Energy," published on Jul. 16, 2009, both of which are Incorporated by reference herein in their entirety for all purposes, and in WIPO PCT Patent Application Publication Number WO/2012/150969, corresponding to WIPO PCT Patent Application Number PCT/US12/20743, entitled "THERMAL ENERGY STORAGE FOR COMBINED CYCLE POWER PLANTS," filed concurrently with the present application, and claiming priority of US Provisional Patent Application No. 61/481,312, filed on May 2, 2011, all of which are incorporated by reference herein in their entirety for all purposes.

Figure 2:
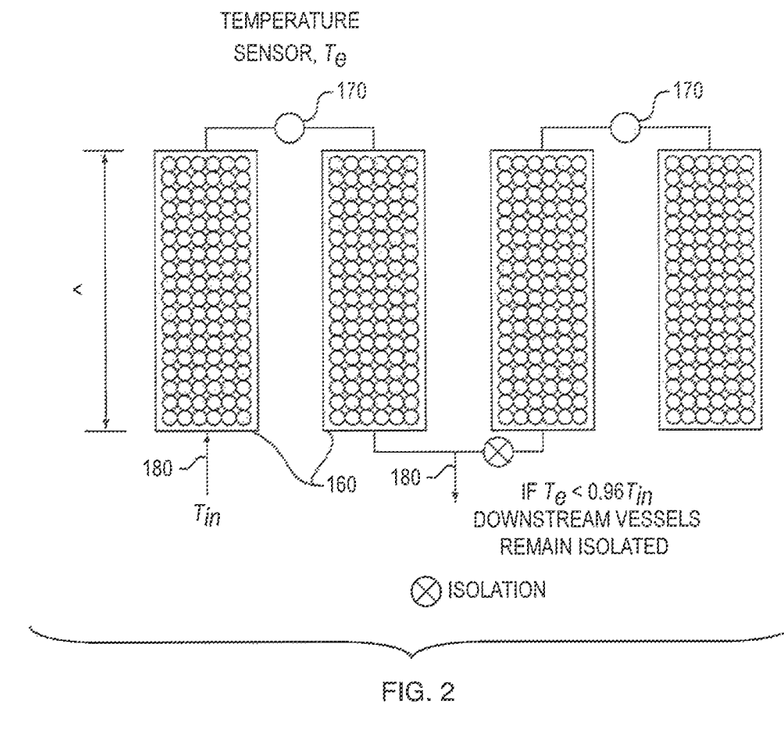
FIG. 2 depicts a schematic representation of an embodiment of a thermal storage system of these teachings.

FIG. 2 depicts an embodiment of a thermal storage system of these teachings utilizing four packed beds (N=4). Referring to FIG. 2, in the embodiment shown therein, four packed beds 160 (thermal storage packed beds in the embodiment shown therein) are connected in series and a sensor 170 (a temperature sensor in the embodiment shown therein) disposed between each consecutive one of the packed beds 160. The temperature sensor can be, for example, but not limited to, a thermocouple or thermistor or a noncontact sensor such as an infrared imager. A flow connection component 180 (such as one or more valves) is disposed between each two consecutive packed beds 160. In FIG. 2, one flow collection component 180 enables fluid input into the first packed bed and another flow connection component 180 enables fluid exit from the second packed bed. The flow connection/control component can be, for example, not a limitation of these teachings, one or more active valves, such as, for example, not a limitation of these teachings, a solenoid valve (a variety of other conventional active valves could also be used).

A control subsystem (205, FIG. 3a or FIG. 3b) is operatively connected to each sensor 170 and to each flow connection/control component 180. The control subsystem 205, if the output of the sensor disposed between an input packed bed and a next packed bed exceeds a predetermined sensor output, provides a signal to several flow connection components 180 and causes transfer of injection of fluid from the input packed bed to a next packed bed in the flow path, referred to as a successor packed bed, and the exit of fluid from an output packed bed to a packed bed succeeding the output packed bed and next to the output packed bed, referred to as a follower packed bed. The successor packed bed becomes the input packed bed and the follower packed bed becomes the output packed bed. In one instance, shown in FIG. 2, the predetermined sensor output is about 96% of the temperature of fluid injected into the input packed bed.

Figure 3A:
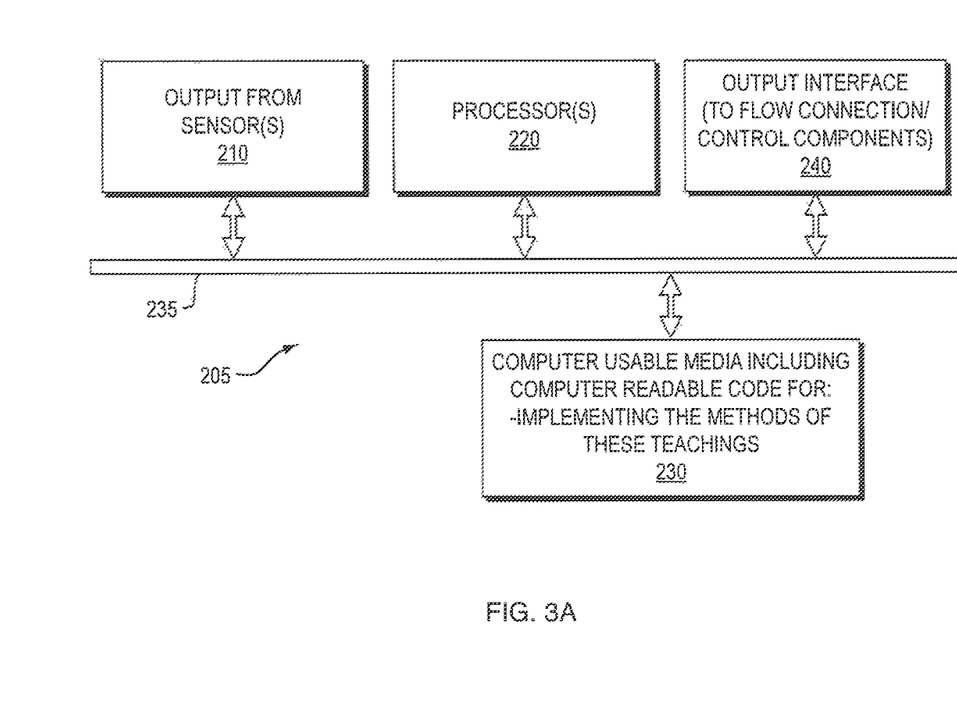
FIG. 3a is a schematic block diagram representation of an embodiment of the control subsystem of these teachings.

In one instance, a portion of the control subsystem 205 is located in proximity to and operatively connected to each sensor 170. In another instance, the control subsystem 205 is centralized and receives signals from each sensor 170. One embodiment of the control subsystem 205 is shown in FIG. 3a. Referring to FIG. 3a, the embodiment shown therein includes an input component 210 receiving the output from the sensors 170, one or more processors 220, one or more computer usable media 230 having computer readable code embodied therein, the computer readable code causing the one or more processors 220 to transfer, if output of the sensor disposed between an input packed bed and a next packed bed exceeds a predetermined sensor output, injection of fluid from the input packed bed to a next packed bed in the flow path, referred to as a successor packed bed, and the exit of fluid from an output packed bed to a packed bed succeeding the output packed bed and next to the output packed bed, referred to as a follower packed bed; wherein the follower packed bed was not previously in the flow path. An output interface 240 provide signals to the flow connection components 180 in order to execute the above disclosed transfer.

Figure 3B:
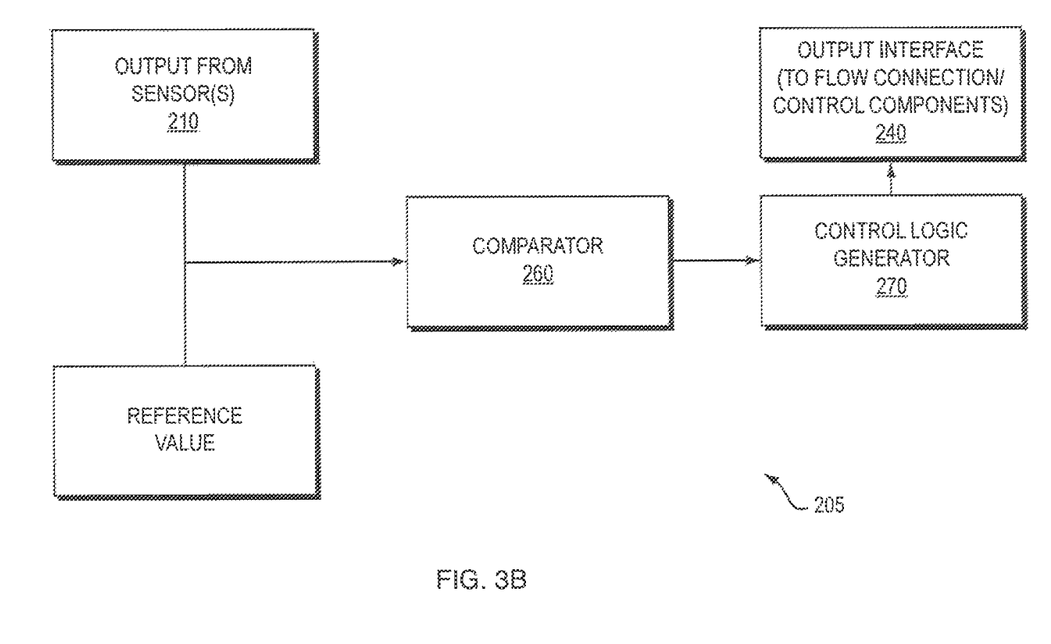
FIG. 3b is a schematic block diagram representation of another embodiment of the control subsystem of these teachings.

FIG. 3b shows another embodiment of the control subsystem 205 of these teachings. Referring to FIG. 3b, in the embodiment shown therein, output 210 from the sensor 170 disposed between an input packed bed and a next packed bed along the flow path is compared to a reference value by a comparator 260. The comparator 260 can be implemented using analog electronic design or digital electronic design. The output of the comparator 260 is provided to a control logic generator 270 (which could also be implemented using digital or analog electronics). The control logic generator 270 generates signals that are divided to flow connection components 180 in order to execute the above disclosed transfer. A digital version of the embodiment shown in FIG. 3b could be implemented in an FPGA.

Although the above described embodiments of the control subsystem use electronics, the final element should be mechanical such as gas dampers at the feed. In view of this, a number of mostly mechanical instantiations of the control subsystem are also within the scope of these teachings.

In one instance, the method and system disclosed herein (and in WIPO/PCT International Publication No. WO2013/015834, (for International Patent Application number PCT/US12/20770), entitled OPTIMUM PROCESS DESIGN OF PACKED BED TYPE THERMAL STORAGE SYSTEMS AND OTHER APPLICATIONS, which is Incorporated by reference herein is entirety and for all purposes) is used to eliminate the need for the utility to maintain extra boilers for electricity or steam production thereby enabling them to reduce the overall cost of supplying energy in urban areas. Due to a lack of utility scale or even building scale batteries, only thermal storage is economically feasible. The simple and economical approach of storing thermal energy is high temperature sensible energy storage. So far, this type of thermal storage has been proposed for very large scale energy supply systems such as Concentrated Solar Power and large scale Combined Cycle Power Plants. The method of these teachings includes a method of using a high temperature sensible energy storage system for storing and supplying energy to large buildings to meet their peak demand for either electric power or steam for heating.

Figure 4:
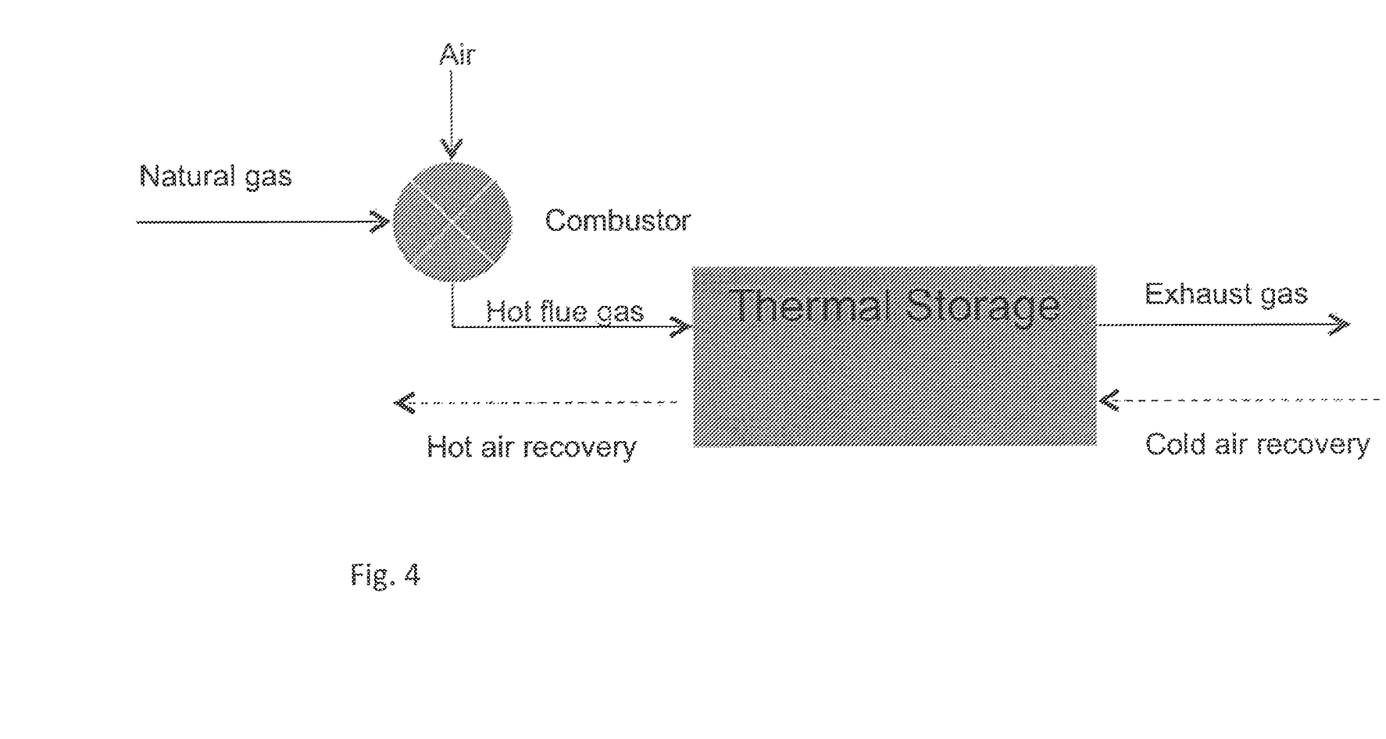
FIG. 4 is a schematic representation of use of thermal storage in buildings.

An optimum method of storing thermal energy in high temperature packed bed media which can be designed to have very low capital costs and operating costs is disclosed herein. Here, we propose to integrate this design with energy utilities of a large building or group of buildings. The method of storing energy in these storage systems includes by storing energy using hot gas. The combustion of natural gas or fuel oil, which eventually produce high temperature combustion gases, can be utilized during the energy storage process. The hot flue gases thus released is passed through thermal storage devices to store the energy. This stored energy can be recovered whenever needed by blowing cold air through the hot storage as shown in FIG. 4. Hot air, which is obtained after recovering the energy, can be used for multiple heating applications such as heating water, generating steam locally and direct building heating applications. Daily heating requirements reach very high levels during early morning hours in the winter seasons. If installed in individual buildings or a group of buildings, this peak energy supply system can greatly benefit from the use of such an energy storage method.

In addition to heating applications, the hot air recovered can be used to directly produce electricity via thermoelectric devices. Various thermo-electric devices are available commercially and can be integrated with the thermal storage system for electric power production. Recently developed (see, for example, Biswas et. al., High-performance bulk thermoelectrics with all-scale hierarchical architectures, Nature, 489, pp. 414-418, 2012) thermo-electric devices can operate at high temperatures (500-600° C.) and have very high thermal to electric efficiencies (15-20%). These newly developed high temperature thermo-electric devices in conjunction with high temperature thermal storage systems will make an ideal combination which fulfills following functions: store surplus thermal energy during non-peak demand hours, provide electric power and/or steam to meet peak demands.

In one embodiment, the particles in the storage medium can be at least one of alumina, silica, quartz, or ceramic. In one instance, the dimensions and characteristics of the particles are selected such that Biot number magnitude does not exceed 0.1. In one embodiment of the storage medium of these teachings, alumina particles (e.g., stones or pebbles) are selected because the heat transfer resistance in a steam system is low. The latter means that the thermal conductivity of the alumina is high and their size is small so the time needed to reach the temperature of the hot fluid stream is very short compared to the fluid residence time, and the temperature of the alumina thus follows that of the surrounding hot fluid practically instantaneously.

The thermal storage system used in these teachings differs from other thermal storage systems, such as the thermal storage systems disclosed in U.S. Pat. No. 7,954,321, issued on Jun. 7, 2011 to R. Shinnar, and in US Patent Application Publication 20090178409, "Apparatus And Method For Storing Heat Energy," published on Jul. 16, 2009, both of which are Incorporated by reference herein in their entirety for all purposes, in a variety of factors, among them being the requirement that storage modules of these teachings preferably do not create substantially any additional back pressure or create minimal additional back pressure.

Figure 5:
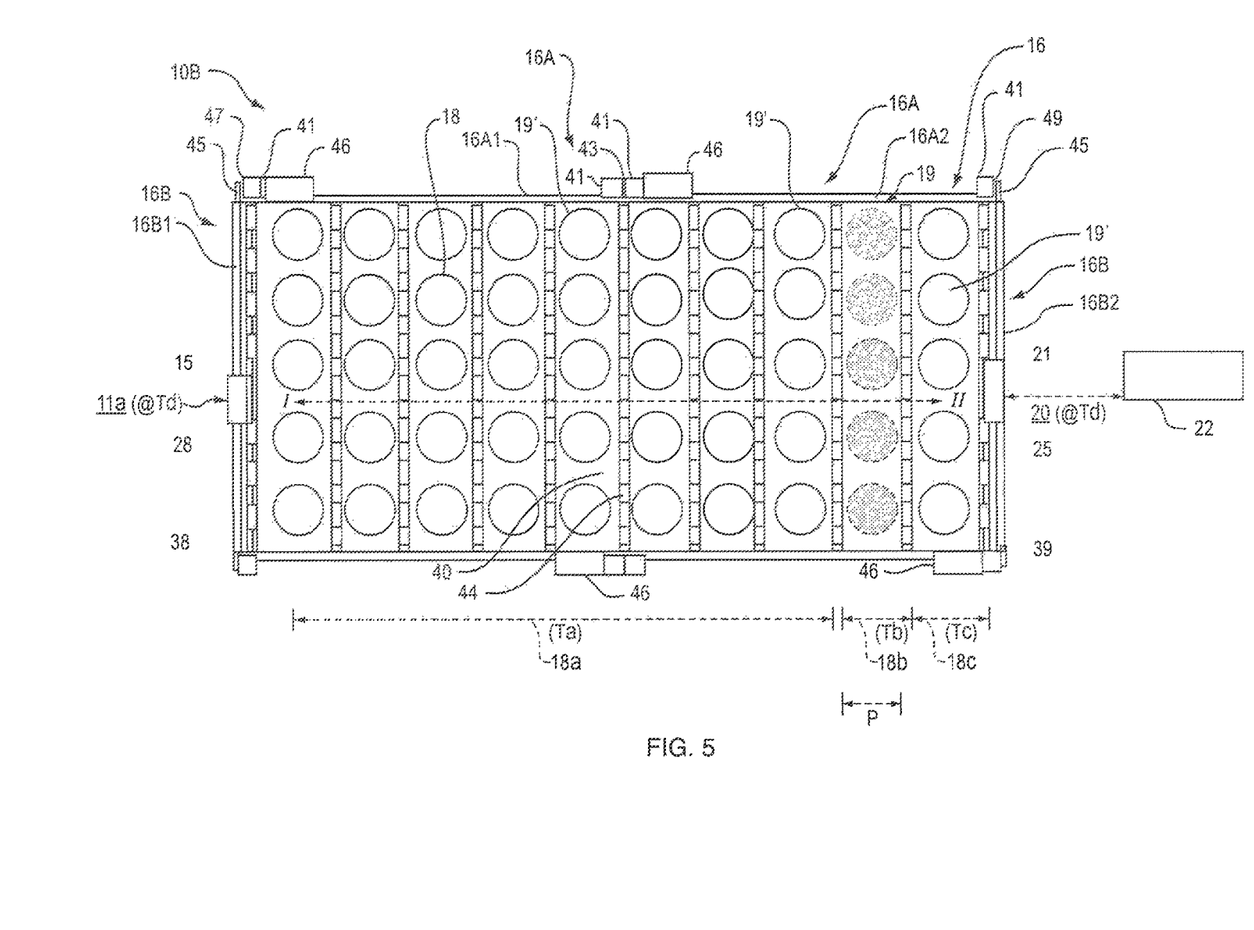
FIG. 5 is a cross-sectional view of a graphical representation of an embodiment of a heat storage subsystem of these teachings.

FIG. 5 shows the assembled modules in side cross-section with the packed (pebble) bed 19 loaded and filling the vessel interior from the vessel top to the vessel bottom, with flow path I-II extending through the medium 18 between the pebble material 19' of pebble bed 19. In one instance of these teachings, a single large storage vessel 16 can be used although smaller modules can be assembled to form the vessel. A single such module (in one instance, a 10-15 ft long section of pipe) is good for a small power plant, while a number of vessels can be assembled, in one instance, in parallel for a larger plant.

Referring again to FIG. 5, in an exemplary embodiment of these teachings, the storage vessel 16 includes preferably cylindrical modules 16A, with two modules 16A1 and 16A2 being vertically stacked and the closed vessel 16 being formed by addition of manifold plates 16B1 and 16B2 at the top 38 and bottom 39 respectively of vessel 16 on the respect outer ends of modules 16A1 and 16A2. Furthermore, Each module 16A is provided with a flange 41 at its top and bottom such that the mated modules can be and are sealed together at meeting adjacent flanges 41 to form seal 43, as indicated. A manifold plate 16B1 is placed at the top end of module 16A 1 such that manifold plate rim 45 cooperates with adjacent flange 41 to form seal 47 thereat and manifold plate 16B2 is placed at the bottom end of module 16A2 such that plate rim 45 cooperates with adjacent flange 41 to form seal 49, thus to provide a sealed storage container 16, as shown in FIG. 5. The cylindrical modules 16A, 16B of FIG. 5 preferably use sections of ready-made large diameter steel pipes such as those used for natural gas pipelines, each cut into a length that is easy to transport and to assemble (such as, in one instance, 5-7.5 ft long sections), and equipped with the flanges to assist assembly of the vessel on location. These modules 16A, 16B, etc., are preferably fitted with perforated plates 40 (FIG. 5), the holes 44 of which are smaller than the diameter of the storage material 19', to retain it in place. It will be appreciated that these plates can be, in one instance, made of non-conducting ceramic to minimize heat conduction through the storage material, since heat transfer is ideally restricted to direct contact between fluid 11a and pebble material 19'. It is desirable to limit conduction of heat particle to particle, and therefore in one practice of the invention we place an insulating step such as plates 40 at intervals, the plates having enough porosity to permit fluid flow and small enough to hold the particles in place.

In one exemplary embodiment, the ceramic filling material 19' is constructed by using small balls of non-porous alumina 3-10 mm in diameter (preferably 6-8 mm), with the desired outcome being a fast heating medium. The diameter of the non-porous alumina balls is selected such that the Biot number magnitude does not exceed 0.1.

The individual modules (each 5 ft high and 15 ft diameter) can be made of concrete with insulation lining or directly be made of insulation bricks. These sections should be designed for easy assembly on location. The short sections can be made and filled with the ceramic in a shop, and transported completely ready for final assembly. Concrete or brick walled modules can be made on-site based on economics associated.

Figure 6:
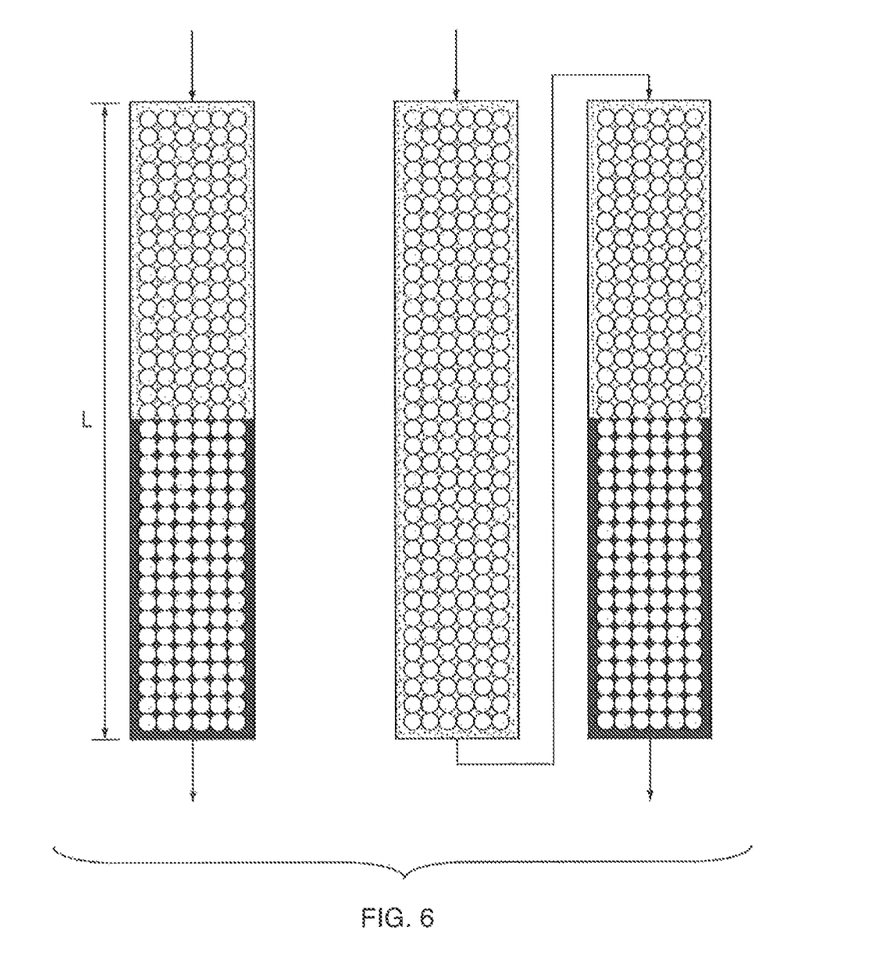
FIG. 6 is a schematic representation of storage used for combined cycle power plant applications.

In one embodiment, the storage method used results in 50% utilizable or top temperature stored energy (shaded portion, FIG. 6). Employing two beds in series increases the utilization to 75%, as shown in FIG. 6, but also doubles pressure drop, which may not be desirable. The method of these teachings for optimizing utilization of packed beds can be applied, as shown in FIGS. 7a-7c, to the thermal storage system (storage modules) 160 in the thermal storage for buildings shown in FIG. 4.

Figure 7A:
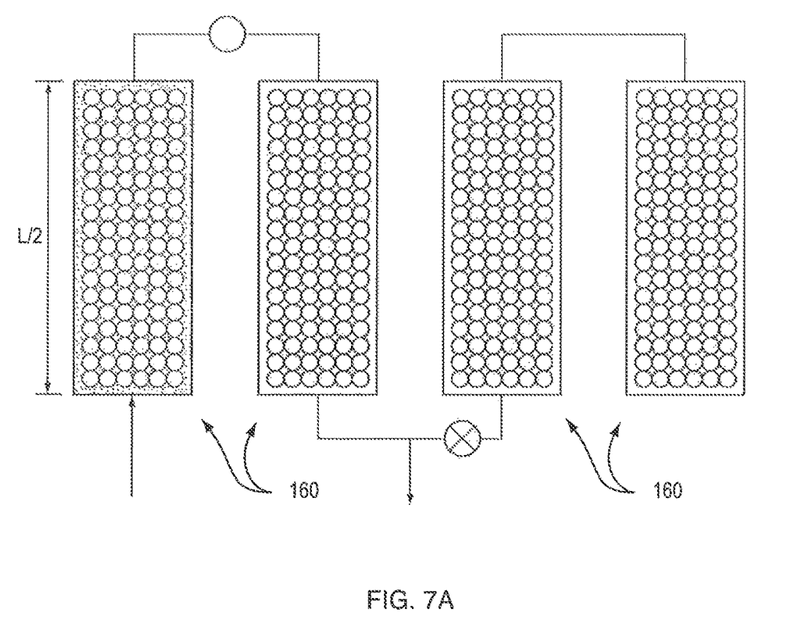
FIGS. 7a-7c are schematic representations of storage used for applications applying embodiments of these teachings.

Referring to FIG. 7a, a system with four packed beds (storage modules) 160 is shown therein. (It should be noted that the number of packed beds is not a limitation of these teachings.) When the fluid input is into the first packed bed and the fluid output is through the second packed bed, as shown in FIG. 7a, the utilization is similar to that in FIG. 6, and so is the pressure drop. When the temperature at the output of the first packed bed is substantially the same as the temperature of the input gas, as shown in FIG. 7b, the input is switched to the second packed bed and the fluid output is switched to the output of the third packed bed. The first packed bed is isolated. When the temperature at the output of the second packed bed is substantially the same as the temperature of the input gas, as shown in FIG. 7c, the input is switched to the third packed bed and the fluid output is switched to the output of the fourth packed bed. The second packed bed is isolated. (It should be noted that although the sensors, flow connection components and the control subsystem are not shown in FIGS. 7a-7c, those components are still present in the system.) Application of the method of these teachings, in the embodiment shown in FIGS. 7a-7c, to the combined cycle power system results in 75% packed bed utilization without an increase in pressure drop.

Figure 7B:
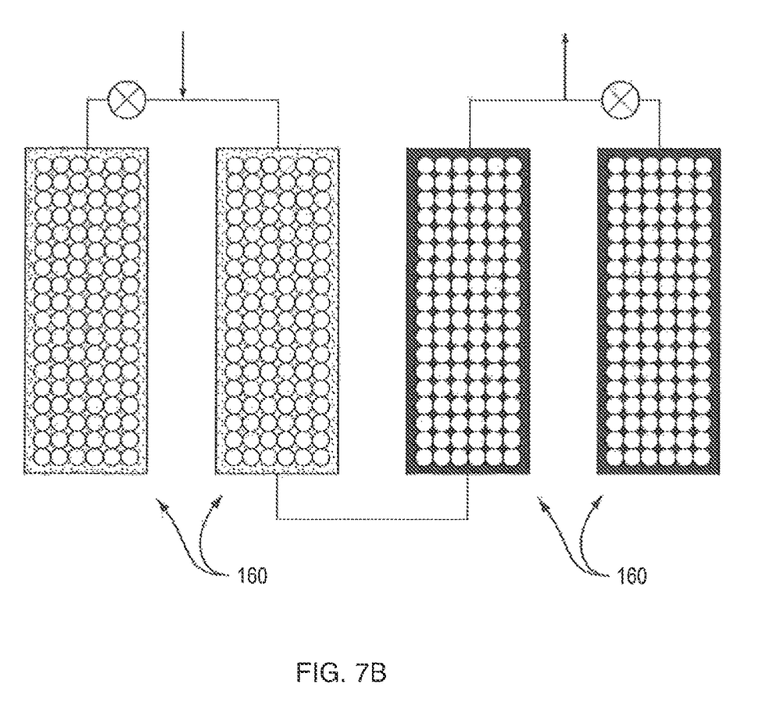
Figure 7C:
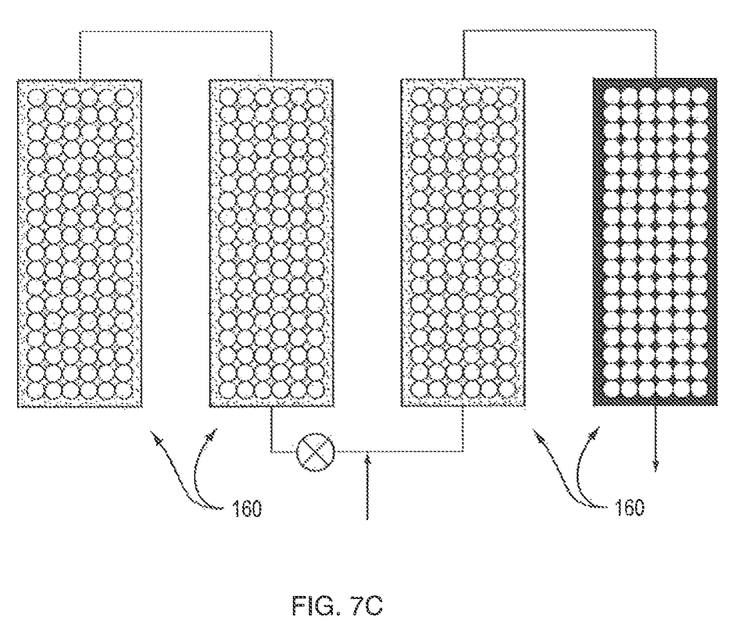

The packed beds (storage module) in FIGS. 7a-7c have a length equal to approximately ½ of the length of the packed bed in FIG. 6. Increasing the number of packed beds in series-parallel combination will keep on increasing the fractional utilization as follows:

For two (2) small (L/2) packed beds in series, the fractional utilization is approximately 50% (as shown in FIG. 5);

For 4 small (L/2) packed beds in series, the fractional utilization is approximately 75%;

For 5 small (L/2) packed beds in series, the fractional utilization is approximately 80%; and For 6 small (L/2) packed beds in series, the fractional utilization is approximately 83%.

Although the fractional utilization increases with the number of packed beds, the increase is not linear. The pressure drop is the same for each of the three configurations described hereinabove.

Figure 8:
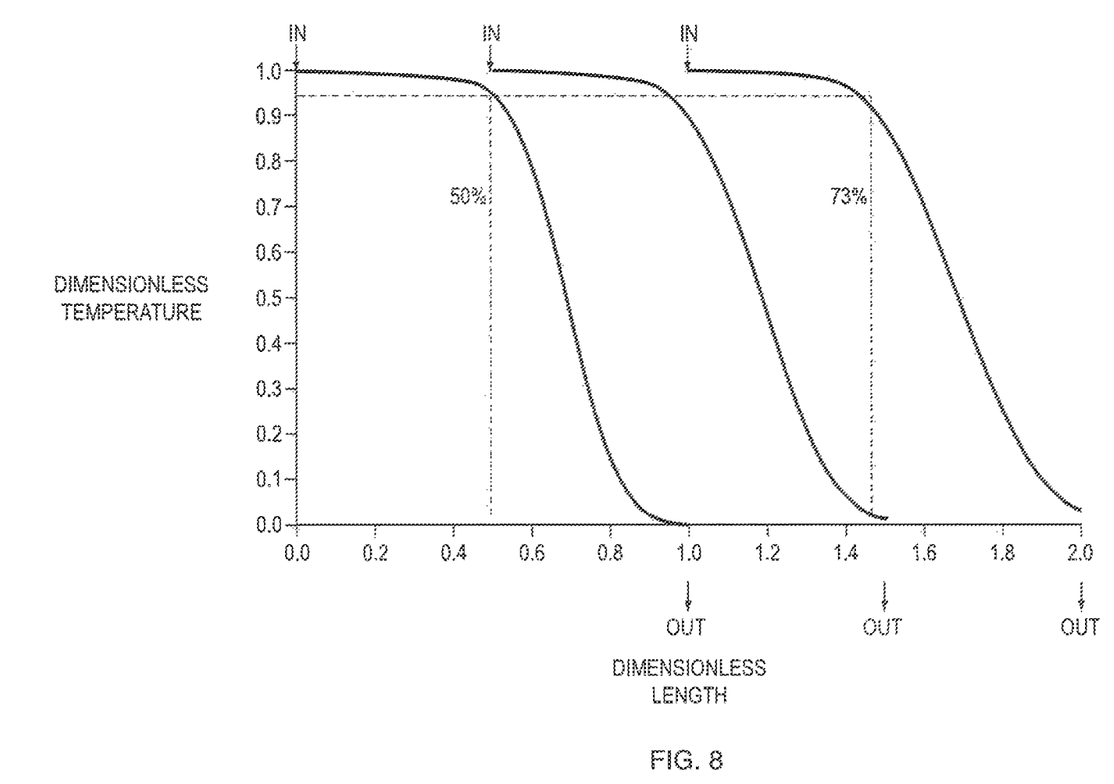
FIG. 8 is a graphical schematic representation of the progress of the temperature front in a four packed bed embodiment of these teachings.

FIG. 8 shows the progress of the temperature front in a four packed bed system of these teachings, such as the system shown in FIGS. 7a-7c. In the exemplary embodiment shown in FIG. 8, the inlet hot gas is at about 1.5 atmospheric pressure, each packed bed is about 15 feet long and the particles in the packed bed are alumina of about 3 mm diameter.

Figure 9:
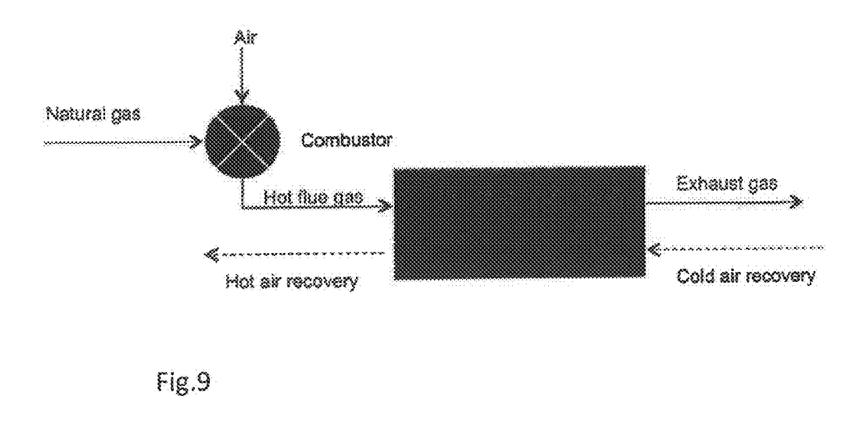
FIG. 9 shows a thermal storage system for buildings according to one embodiment of these teachings.

The best possible method of storing energy in the storage systems of these teachings of these teachings is by using hot gas. The combustion of natural gas or fuel oil, which eventually produce high temperature combustion gases, can be utilized during the energy storage process. The hot flue gases thus released can be passed through thermal storage devices to store the energy. This stored energy can be recovered whenever needed by blowing cold air through the hot storage as shown in FIG. 9. Hot air, which is obtained after recovering the energy, can be used for multiple heating applications such as heating water, generating steam locally and direct building heating applications. Daily heating requirements reach very high levels during early morning hours in the winter seasons. If installed in individual buildings or a group of buildings, this peak energy supply system can greatly benefit from the use of such an energy storage method.

In addition to heating applications, the hot air recovered can be used to directly produce electricity via thermo-electric devices. Various thermo-electric devices are available commercially and can be integrated with the thermal storage system for electric power production. Recently developed (see Biswas et. al., High-performance bulk thermoelectrics with all-scale hierarchical architectures, Nature, 489, 2012) thermo-electric devices can operate at high temperatures (500-600° C.) and have very high thermal to electric efficiencies (15-20%). These newly developed high temperature thermoelectric devices in conjunction with high temperature thermal storage systems will make an ideal combination which fulfills following functions: store surplus thermal energy during non-peak demand hours, provide electric power and/or steam to meet peak demands.

Although the system and method of these teachings has been described in terms of two embodiments, these teachings are not limited only to only those two embodiments. Other embodiments are within the scope of these teachings.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized these teachings are also capable of a wide variety of further and other embodiments within the spirit and scope of the appended claims.

What is claimed is:

1. A method for managing thermal storage capability of a building, the method comprising:

blowing air, after it has been determined that the building is entering a time of peak energy load, the air being blown at a first temperature through a thermal storage bed comprising a number of packed beds; the thermal storage bed having thermal energy stored therein;

permitting air at the first temperature to absorb heat from the thermal storage bed, thereby heating the air to a second temperature; and circulating the air at the second temperature to one of the building or one or more thermo-electric devices; wherein the thermal energy has been stored in the thermal storage bed by:

(a) initially injecting fluid, the fluid being used in a heat and mass transfer operation, into a first packed bed from a first number of packed beds; said first packed bed being an input packed bed; a sensor being disposed between each consecutive one of the number of packed beds from the number of packed beds; exit of the fluid being enabled a second number of packed beds away from and along a flow path including the input packed bed; a packed bed the second number of packed beds away from the input packed bed being an output packed bed;

(b) sensing, utilizing the sensor between the input packed bed and a consecutive packed bed, a quantity representative of the heat and mass transfer operation;

(c) transferring, if output of the sensor disposed between the input packed bed and a next packed bed in the flow path exceeds a predetermined sensor output, injection of fluid from the input packed bed to the next packed bed in the flow path, referred to as a successor packed bed, the input packed bed becoming isolated, and transferring the exit of fluid from the output packed bed to a packed bed succeeding the output packed bed and next to the output packed bed, referred to as a follower packed bed; wherein, when output of the sensor disposed between the input packed bed and a next packed bed in the flow path exceeds a predetermined sensor output, the input packed bed is taken out of the flow path and fluid inlet injects fluid directly into the successor packed bed; wherein the follower packed bed was not previously in the flow path; the successor packed bed becoming the input packed bed and the follower packed bed becoming the output packed bed; wherein, since the fluid is injected into the input packed bed and exits from the output packed bed, flow is in a series connection from the input packed bed to the output packed bed;

(d) Repeating steps (b) and (c) until the output packed bed is a last packed bed from the first number of packed beds.

2. The method of claim 1 wherein the second number of packed beds is one; whereby a number of packed bed in the flow path is two.

3. The method of claim 1 wherein the first number of packed beds constitute a thermal storage system and wherein the sensor senses temperature.

4. The method of claim 3 wherein each packed bed comprises high thermal conductivity and low heat transfer resistance particles; said particles being in contact with each other and defining voids between said particles in order to facilitate flow of the fluid in a predetermined direction; said predetermined flow direction constituting a longitudinal direction; dimensions of said particles and of said each packed bed being selected such that a resultant back pressure is at most a predetermined back pressure.

5. The method of claim 4 wherein the dimensions of said particles are selected such that Biot number magnitude does not exceed 0.1.

6. The method of claim 5 wherein said particles comprise alumina and wherein a characteristic dimension of said particles is between about 6 mm to about 8 mm.

7. The method of claim 4 wherein said particles comprise at least one of alumina, graphite, silica, quartz, or ceramic.

8. The method of claim 4 wherein a ratio of a characteristic dimension of said packed bed in a longitudinal direction, said characteristic dimension of said packed bed in a longitudinal direction comprising length, to a characteristic dimension of said packed bed in a direction transverse to the longitudinal direction, said characteristic dimension of said packed bed in a direction transverse comprising diameter, is at most 2.15.

9. The method of claim 3 wherein a predetermined sensor output is about 96% of a temperature of the fluid injected into the input packed bed.

10. The method of claim 3 wherein the second number of packed beds is one; whereby a number of packed bed in the flow path is two.

11. The method as recited in claim 1, wherein the air at the second temperature is circulated to the building; and wherein the method further comprises permitting the air at the second temperature to release heat into the building thereby cooling the air to a third temperature.

12. The method as recited in claim 11, further comprising re-circulating the air at the third temperature through the thermal storage bed for subsequent re-heating.

13. The method as recited in claim 1, wherein thermal energy from hot flue gases has been stored in the thermal storage bed.

14. The method as recited in claim 1, wherein the air at the second temperature is provided to the one or more thermoelectric devices.

* * * * *